United States Patent [19]

Salowe

[11] Patent Number: 4,577,279
[45] Date of Patent: Mar. 18, 1986

[54] METHOD AND APPARATUS FOR PROVIDING OFFSET COMPENSATION

[75] Inventor: Seymour Salowe, Murrysville, Pa.

[73] Assignee: Westinghouse Electric Corp., Pittsburgh, Pa.

[21] Appl. No.: 499,624

[22] Filed: May 31, 1983

[51] Int. Cl.[4] .............................................. H02H 3/18
[52] U.S. Cl. ..................... 364/483; 361/80; 364/571; 364/572
[58] Field of Search ............... 364/480, 481, 571, 572, 364/575, 724, 733, 734, 492, 483; 333/181; 328/167; 324/102; 361/42, 80

[56] References Cited

U.S. PATENT DOCUMENTS

| | | | |
|---|---|---|---|
| 4,344,150 | 8/1982 | McLaughlin | 364/724 |
| 4,455,612 | 6/1984 | Girgis et al. | 364/492 X |
| 4,493,047 | 1/1985 | Werst | 364/724 |

OTHER PUBLICATIONS

IEEE Power Engineering Conf., Jul. 13–18, 1980; "A Microcomputer Based Ultra–High Speed Distance Relay: Field Tests"; Phadke et al, pp. 1–8.

Primary Examiner—Errol A. Krass
Assistant Examiner—Kevin J. Teska
Attorney, Agent, or Firm—W. E. Zitelli

[57] ABSTRACT

An apparatus and method for removing a transient exponential noise signal from a sinusoidal signal. The effects of the transient are removed by sampling the sinusoidal signal, averaging the transient over a time interval corresponding to an integral number of cycles of the sinusoidal signal, and subtracting this average from the sample at the midpoint of the time interval. The result is a compensated sinusoidal signal wherein the effects of the transient have been removed. The time interval is progressively moved ahead to produce a complete compensated signal by subtracting the average of the exponential from the value thereof at the midpoint of each successive time interval.

4 Claims, 5 Drawing Figures

METHOD AND APPARATUS FOR PROVIDING OFFSET COMPENSATION

BACKGROUND OF THE INVENTION

1. Field of the Invention

This invention relates generally to a method and apparatus for removing noise from a sinusoidal signal, and more specifically to such a method and apparatus for removing a transient exponential noise component from a sinusoidal signal.

2. Description of the Prior Art

Electrical transmission lines and power generating equipment must be protected against insulation faults and consequent short circuits that can cause collapse of the power system, serious and expensive apparatus damage, and personal injury. For instance, such a fault condition is caused by lightning-induced flashover from a transmission line to ground or between adjacent transmission line conductors. Under such a fault condition, line currents can increase to several times the normal value, thereby causing loss of synchronism among generators and damaging or destroying both the transmission line and the attached equipment. To avoid equipment damage and collapse of the entire power system, faulted apparatus on the main transmission line are isolated from the network by protective relays. The protective relays, by continuously monitoring ac voltages and currents, locate line faults and initiate line isolation via tripping of the appropriate circuit breakers. These faults are located by examining the relationship of the ac voltages and currents. Analysis of these ac voltages and currents is complicated by the presence of a decaying exponential component during the first few cycles after the fault. This decaying exponential is caused by the RL nature of the transmission line. The fault cannot be detected until the exponential component has decayed completely.

After the fault, utility personnel may inspect the transmission line to access the damage and make necessary repairs. The cost of inspections can be lowered significantly if the distance from the substation to the fault is accurately known. Also, repeated faults occurring at the same distance indicate the need to replace a weak insulator. A fault locator is used to determine the distance from the substation to the fault. Like the protective relays discussed above, operation and accuracy of the fault locator is hampered by the transient exponential component.

The offset compensator disclosed herein, when incorporated into a fault locator or a protective relay, removes the decaying exponential component from the sinusoidal fault current signal to provide a more accurate estimate of the distance to the fault or faster fault detection. Various prior art techniques are known for smoothing digital samples of analog signals. For example, the sampled values can be averaged over a predetermined time interval and this average used to modify sampled values within the interval. This technique removes the high-frequency components in the digital samples. The technique of the present invention is an improvement to the prior art smoothing technique in that it removes low-frequency components, e.g., a transient exponential noise component.

SUMMARY OF THE INVENTION

An apparatus and method for removing transient exponential noise component from a sampled sinusoidal signal is disclosed. This filtering action is achieved by recognizing that for a predetermined time interval and a predetermined range of time constants, the average of a transient exponential is equal to the value of the exponential near the midpoint of the predetermined time interval. Using this result, the filtering is accomplished by averaging the sampled values over a cycle (or an integral number thereof) and then using the average to correct the sample at the midpoint of the interval.

BRIEF DESCRIPTION OF THE DRAWINGS

The invention may be better understood, and further advantages and uses thereof more readily apparent, when considered in view of the following detailed description of exemplary embodiments, taken with the accompanying drawings in which.

DESCRIPTION OF THE PREFERRED EMBODIMENTS

I-Fundamental Principles

Analysis of the fault current is complicated by the presence of a decaying transient exponential noise component in the fault current. For fault detection or accurate determination of the fault location, it is necessary to reduce or eliminate this component. An RL circuit is used to approximate the fault current. The transient current in such a circuit is expressed in closed form by:

$$i_t = Ae^{-\frac{R}{L}t}\sin(\theta - \phi) - A\sin(wt + \theta - \phi)$$

where:

$\theta$ = switching angle $$\phi = \tan^{-1}\frac{\omega L}{R}$$

Figure 1A:
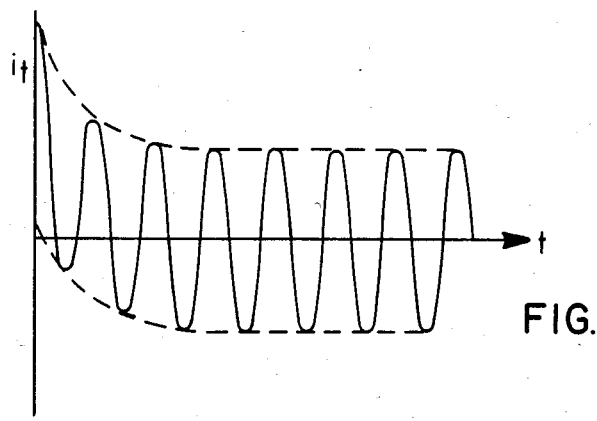
FIG. 1A depicts a sinusoidal signal distorted by a transient exponential noise component.
Figure 1B:
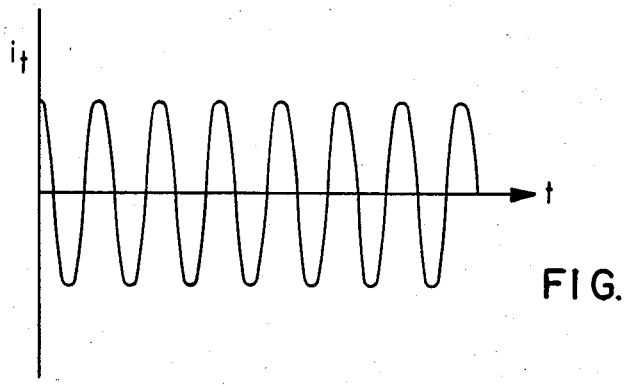
FIG. 1B depicts the sinusoidal signal of FIG. 1A with the transient exponential noise component removed.

The first term of this equation is the decaying transient exponential, and the second is the 60 Hz sinusoidal power component. This equation is graphed in FIG. 1A, where an arbitrary time constant is assumed. Fourier analysis of the signal illustrated in FIG. 1A indicates that several cycles are necessary for the exponential to decay to a point where errors in determining the fault location are minimal. Errors of 9% are observed in the first two cycles. Since high-speed circuit breakers operate in approximately two cycles, use of the uncompensated signal illustrated in FIG. 1A in a protective relay to provide fault detection and protection also produces considerable error. In a fault locating implementation, the transient produces inaccuracies in the location of the fault. Elimination of the decaying transient, which produces these errors, is the objective of the present invention. The present invention produces a compensated signal of the form shown in FIG. 1B from the uncompensated signal in FIG. 1A.

To effectively remove the decaying transient, it is necessary to observe, as previously mentioned, that the transient current has two components. These components are a decaying exponential and a sine wave. The average of the total transient is equal to the sum of the averages of the two components since integration is a linear process. That is, $$\frac{1}{T}\int_0^T i_t dt = \frac{1}{T}\int_0^T e^{-\frac{R}{L}t}\sin(\theta + \phi)dt +$$

$$\frac{1}{T}\int_0^T -\sin(wt + \theta - \phi)dt$$

If the period of integration is one cycle, the average of the second component, which is a sine wave, is zero. Thus, over one cycle the average of the transient equals the average of the decaying exponential component. It is desired to find a point where the average of the exponential equals the exponential. Then, subtracting the average from the total current at this point leaves only the 60 Hz component. Therefore, the location where:

$$f\int_{t_1}^{t_1+\frac{1}{f}} Ae^{-\frac{R}{L}t}\sin(\theta - \phi)dt = Ae^{-\frac{R}{L}(t_1+\Delta t)}\sin(\theta - \phi)$$

is desired. Integrating:

$$-\frac{f}{\frac{R}{L}} A\left[e^{-\frac{R}{L}t}\sin(\theta - \phi)\right]_{t_1}^{t_1+\frac{1}{f}} =$$

$$Ae^{-\frac{R}{L}(t_1+\Delta t)}\sin(\theta - \phi)$$

Now solving for $\Delta t$ and dividing through by the period yields:

$$\Delta t = \frac{L}{R}\ln\left[\frac{fL}{R}\left(1 - e^{-\frac{R}{fL}}\right)\right]$$

$$\frac{\Delta t}{\frac{1}{f}} = \frac{fL}{R}\ln\left[\frac{fL}{R}\left(1 - e^{-\frac{R}{fL}}\right)\right]$$

To simplify, it is desirable to express the time constant as a number of periods, that is:

$$\frac{L}{R} = \frac{N}{f}$$

Therefore, $$\frac{\Delta t}{\frac{1}{f}} = N\ln\left[N\left(1 - e^{-\frac{1}{N}}\right)\right]$$

In the above equation, $$\frac{\Delta t}{1/f}$$

is the fraction of a cycle where the average of the exponential equals the value of the exponential. Note, it is a function of only the frequency and the time constant. Performing the arithmetic shows that for values of N from 1 through 100 and for a frequency of 60 Hz the value of $$\frac{\Delta t}{1/f}$$

is slightly under one-half. Note that for N=1 through 100, the time constant ranges from 16 ms to 1600 ms. Therefore, for each of these time constants, the point where the average of the exponential equals the value of the exponential is nearly constant, at slightly less than halfway through the cycle.

II-Description and Operation of the Fault Locator With Offset Compensation

Figure 2:
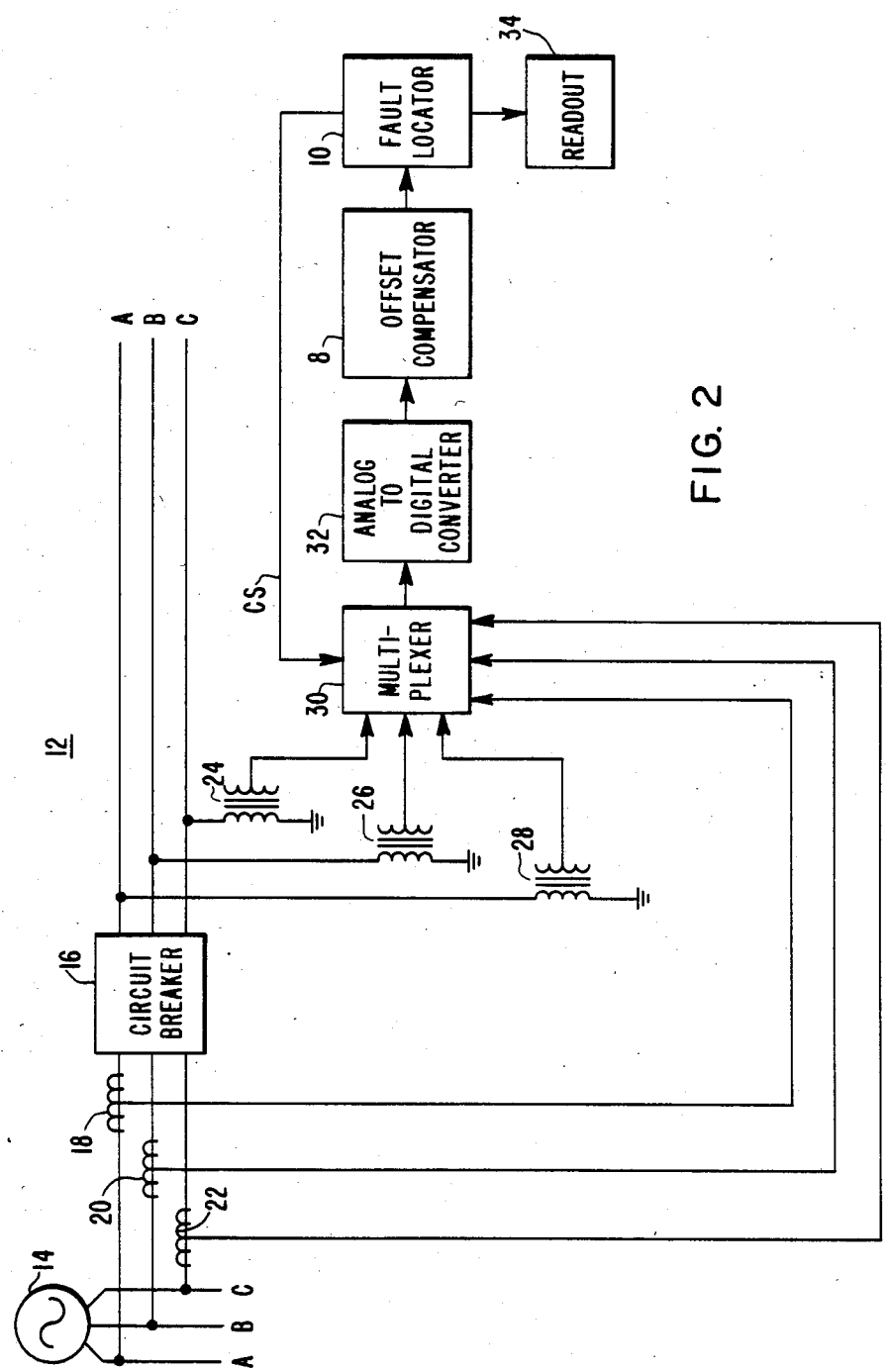
FIG. 2 illustrates the connection of a fault locator and associated apparatus to a power line transmission system.

In FIG. 2, there is shown a partial block and partial schematic diagram including an offset compensator 8 used in association with a fault locator 10 and connected to a three-phase ac electrical power transmission line system 12.

Specifically, the three-phase ac electrical power transmission line system 12 includes an ac source 14 for producing an ac electrical power signal having a frequency of 50 Hz or 60 Hz. The ac source 14 is connected to the three-phase ac electrical power transmission line system 12 via a circuit breaker 16. The three-phase ac electrical power transmission line system 12 includes phase conductors A, B, and C. A current transformer 18 located on the phase A conductor produces a current signal that is representative of the current on the phase A conductor. Similarly, a current transformer 20 located on the phase B conductor produces a signal that is representative of the current thereon; a current transformer 22 on the phase C conductor produces a signal that is representative of the current thereon. The signals produced by the current transformers 18, 20, and 22, are input to first, second, and third data input terminals, respectively, of a multiplexer 30.

A voltage transformer 28 is connected to the phase A conductor to provide a signal representative of the voltage thereon. A voltage transformer 26 is connected to the phase B conductor to provide a signal representative of the voltage on the phase B conductor; a voltage transformer 24 is connected to the phase C conductor to provide a signal representative of the voltage thereon. The signals from the voltage transformers 28, 26, and 24 are input to fourth, fifth, and sixth data input terminals, respectively, of the multiplexer 30. Note that the data signals input to the multiplexer 30 are the ac fault voltages and currents as distorted by the transient exponential component. In the multiplexer 30, the six data signals are multiplexed for input to an analog-to-digital converter 32, which can convert only one analog signal at a time. Operation of the multiplexer 30 is controlled by a control signal, CS, from the fault locator 10 to a control input terminal of the multiplexer 30.

In the analog-to-digital converter 32, the signals input thereto are sampled and converted to digital values. The digital signals from the analog-to-digital converter 32 are input to the offset compensator 8. The fault locator 10 analyzes the compensated signals from the offset compensator 8 to determine the location of the fault on the three-phase ac electrical power transmission line system 12. The fault locator 10 communicates with a readout 34 where the distance to the fault is displayed.

Figure 3:
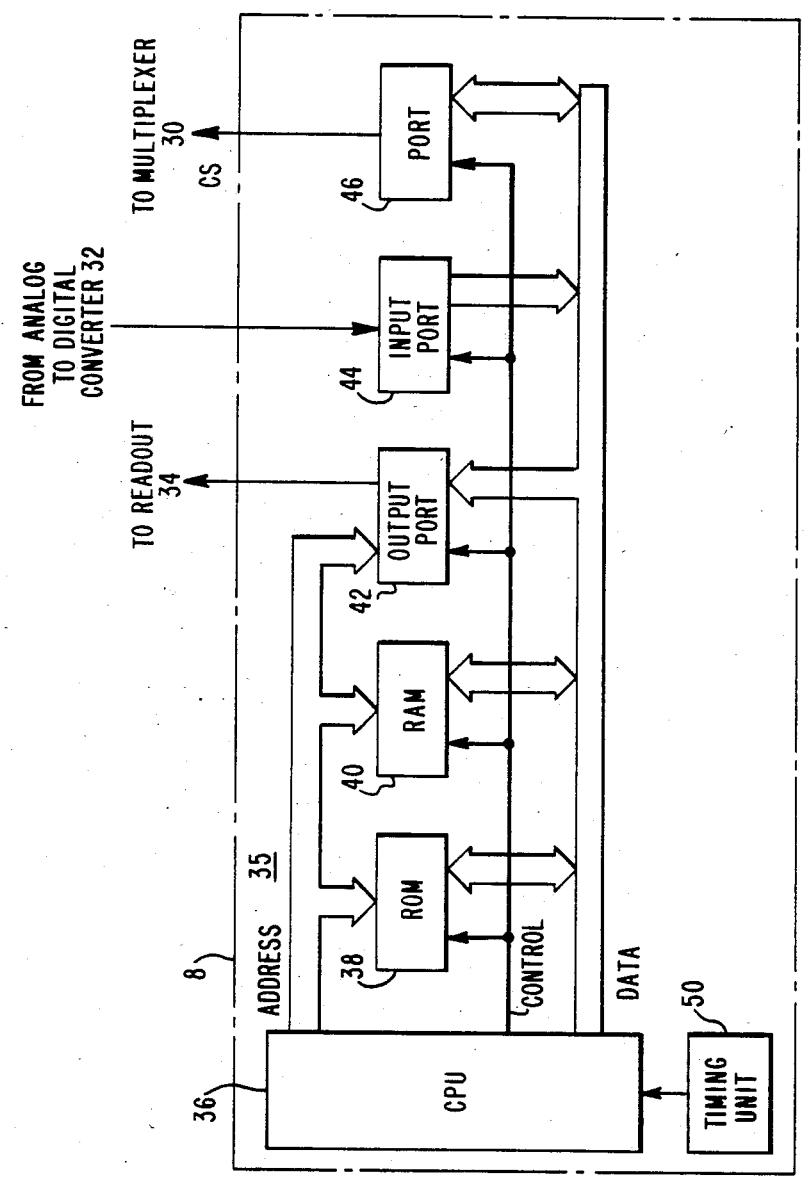
FIG. 3 is a block diagram of the offset compensator illustrated in FIG. 2.

Turning to FIG. 3, there is shown a block diagram of the offset compensator 8. The offset compensator 8 can be implemented with a digital computer, more specifically by a microcomputer. FIG. 3 is a block diagram of a microcomputer 35 that may be used. Specifically, the offset compensator 8 includes a central processing unit (CPU) 36, a read-only memory (ROM) 38, a random-access memory (RAM) 40, an output port 42, an input port 44 and a port 46. The CPU 36 communicates via an address bus with the ROM 38, the RAM 40, and the output port 42. Via control lines the CPU 36 communicates with the ROM 38, the RAM 40, the output port 42, the input port 44, and the port 46. Data is transferred bidirectionally on the data bus, which connects the CPU 36 with the ROM 38, the RAM 40, the output port 42, the input port 44, and the port 46. Data from the output port 42 is input to the readout 34 (not shown in FIG. 3). Digital data from the analog-to-digital converter 32 (not shown in FIG. 3) is input to the input port 44. The signal CS from the CPU 36 is input to the multiplexer 30 via the port 46. The timing unit 50 provides appropriate timing signals to the CPU 36.

Figure 4:
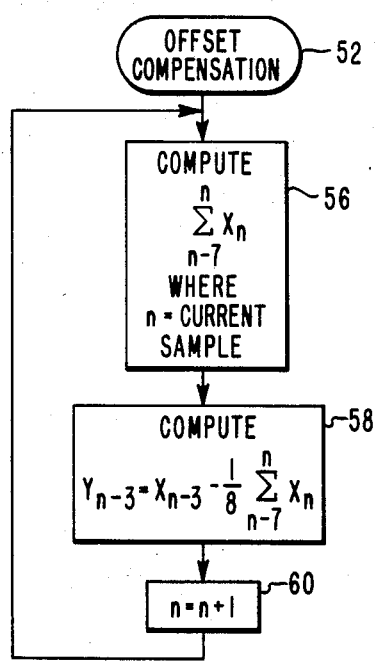
FIG. 4 is a software flowchart for the offset compensator of FIG. 3.

FIG. 4 illustrates one implementation for the offset compensation technique of the present invention. This implementation involves a software flowchart processed by the microcomputer 35 and operates continuously to remove the transient exponential noise component from the sinusoidal signals input to the analog-to-digital converter 32. The offset compensation flowchart is entered at an entry point 52. At a step 56 eight sample values from the analog-to-digital converter 32 are added by the microcomputer 35. These samples values, which represent uncompensated digitized values of the sinusoidal fault signals, are designated $X_n$ through $X_{n-7}$, where n is the current sample value. The values $X_{n-1}$ through $X_{n-7}$ represent the previous seven sample values. At a step 58 the average of these eight sample values is calculated and then subtracted from the sample at the mid-position of the eight sample values. The result, designated $Y_{n-3}$, represents the compensated digitized value of the sinusoidal signal. In effect, the step 58 implements the results discussed above in the section entitled "*Fundamental Principles*". Note that for exact compensation, the average should be subtracted from a point in each cycle of the uncompensated sinusoidal signal given by $$\frac{\Delta t}{1/f},$$

i.e., a point slightly before the midpoint of each cycle. In practice, because there are eight sample values taken for each cycle the compensation is accomplished at the midpoint of each cycle.

At a step 60, the subscript n is incremented. The loop including the steps 56, 58, and 60 operates continuously to remove the transient exponential noise component, producing the compensated digitized values from the uncompensated ones. In effect, this loop produces a moving window of eight data samples. The average of the eight data samples is used to correct the fourth data sample in each window. As the window moves forward in time, each data sample is progressively corrected from an uncompensated to a compensated value.

The fault locator 10, using well-known techniques, processes the compensated digitized values to determine the location of the fault. In lieu of the fault locator 10, a protective relay can process the compensated digitized values to detect a fault.

The discussion of the software flowchart of FIG. 4 is intended for purposes of illustration and not limitation. It is anticipated that alternative embodiments of the present invention may be conceived wherein the location of the instructions for performing the compensation is different from that shown in the discussed flowchart. These alternative embodiments are believed to fall within the spirit and scope of the present invention as claimed hereinafter. The novel offset compensator 8 can also be implemented using traditional hard-wired techniques.

Further, use of the offset compensator 8 is not limited to fault location or detection schemes. The novel device can be employed with any sinusoidal signal that is offset by an increasing or decaying exponential transient caused by an RL or RC effect. Of course, the theoretical principles discussed above must be taken into consideration in each application. Also, depending on the nature of the sinusoidal signal and the harmonic content thereof, sampling rates in excess of eight samples per cycle may yield an improved compensated result.

The present invention also includes a method for removing a transient exponential noise signal from a sinusoidal signal. This is accomplished by averaging the transient signal over a given time interval, equal to one cycle of the sinusoidal signal or an integral number thereof, and subtracting the average from the value of the exponential at the midpoint of the interval. The result removes the effects of the transient, producing a sinusoidal signal absent the transient.

What is claimed is:

1. A fault locating device adapted for use in a power system network to determine a fault location on a faulted power line within a few cycles after fault occurrence from measured signals representative of the voltage and current of the faulted power line, said measured signals including a transient decaying exponential offset component initiated by said line fault, said fault locating device including:
   means coupled to a power line in said power system network for measuring the voltage and current thereof and for generating signals representative of said measured voltage and current;
   means for sampling the amplitudes of at least one said voltage and current signals at a sampling rate which renders M+1 amplitude samples per cycle of the power line frequency;
   offset compensating means for removing substantially said transient decaying exponential offset component from said at least one of said voltage and current signals by operating on the sampled amplitudes of said one signal X to generate compensated amplitude samples therefrom in accordance with the following relationship:

$$Y_{N-P} = X_{N-P} - \left(\frac{1}{M+1}\right) \sum_{a=0}^{M} X_{N-a},$$

where $X_N$ denotes an instant amplitude sample taken by said sampling means, $X_{N-1}$ through $X_M$ denote the previous M consecutive sample amplitudes, whereby the M+1 amplitude samples form a set of samples which set moves in time with each taking of a new instant amplitude sample by said sampling means, where $X_{N-P}$ denotes an amplitude sample within each sample set P samples from said instant amplitude sample $X_N$, and where $Y_{N-P}$ denotes a corresponding compensated amplitude sample for each sample set; and fault locator for determining the fault location on the faulted power line from the compensated amplitude samples generated by said offset compensating means, whereby the determination of the fault location may be performed within a few cycles of the fault occurrence without being hampered by the transient offset component.

2. The fault locating device in accordance with claim 1 wherein the offset compensating means includes means for operating on the amplitude sample $X_{N-P}$ of each sample set in accordance with the relationship set forth in claim 1, where $X_{N-P}$ is a sample of the sample set $X_N$ through $X_{N-M}$ such that P is slightly less than ½ of M+1.

3. The fault locating device in accordance with claim 1 wherein the sampling means includes means for digitizing the amplitude samples; and wherein the offset compensating means includes programmed microcomputer apparatus for operating on said digital amplitude samples in accordance with the relationship set forth in claim 1 to generate digital compensated amplitude samples.

4. The fault locating device in accordance with claim 1 wherein the sampling means includes means for taking eight (8) amplitude samples per cycle of the power line frequency; and wherein the offset compensating means includes means for operating on the sample $X_{N-3}$ of each sample set in accordance with the relationship set forth in claim 1.

* * * * *